(12) United States Patent
Oba et al.

(10) Patent No.: US 10,008,969 B2
(45) Date of Patent: Jun. 26, 2018

(54) POWER SUPPLY SYSTEM FOR ELECTRICALLY POWERED VEHICLE

(71) Applicant: Toyota Jidosha Kabushiki Kaisha, Toyota-shi, Aichi-ken (JP)

(72) Inventors: Tomoko Oba, Nagoya (JP); Kenji Uchida, Toyota (JP); Yasuhiro Terao, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 147 days.

(21) Appl. No.: 15/271,505

(22) Filed: Sep. 21, 2016

(65) Prior Publication Data
US 2017/0093319 A1     Mar. 30, 2017

(30) Foreign Application Priority Data

Sep. 29, 2015 (JP) ................................. 2015-191094

(51) Int. Cl.
| | |
|---|---|
| *B60L 11/18* | (2006.01) |
| *H02P 27/06* | (2006.01) |
| *B60L 11/04* | (2006.01) |
| *B60L 11/08* | (2006.01) |
| *B60L 1/00* | (2006.01) |
| *B60L 3/00* | (2006.01) |

(52) U.S. Cl.
CPC ............... *H02P 27/06* (2013.01); *B60L 1/00* (2013.01); *B60L 3/0084* (2013.01); *B60L 11/04* (2013.01); *B60L 11/08* (2013.01); *B60L 11/18* (2013.01); *Y02T 10/7005* (2013.01)

(58) Field of Classification Search
CPC .......... B60L 11/18; B60L 1/00; B60L 3/0084; B60L 11/04; Y02T 10/7005; H02P 27/06
See application file for complete search history.

(56) References Cited

U.S. PATENT DOCUMENTS

| | | |
|---|---|---|
| 2012/0055727 A1 | 3/2012 | Omiya et al. |
| 2015/0097426 A1* | 4/2015 | Yamane ............... B60L 11/1803 307/10.1 |

FOREIGN PATENT DOCUMENTS

| | | |
|---|---|---|
| JP | 2008-306795 A | 12/2008 |
| JP | 2015-070645 A | 4/2015 |
| WO | 2010/131340 A1 | 11/2010 |

* cited by examiner

*Primary Examiner* — Robert Deberadinis
(74) *Attorney, Agent, or Firm* — Dinsmore & Shohl LLP

(57) ABSTRACT

When a voltage (auxiliary power supply voltage) on an auxiliary power supply line is instantaneously decreased to be smaller than a resetting voltage, a resetting operation is automatically started in each of the MG-ECU and the HV-ECU to perform an initialization process. After the resetting operation of the MG-ECU and/or the HV-ECU, the MG-ECU causes a converter to start a forced discharging operation when a DC voltage of a first smoothing capacitor is higher than a first reference voltage, and/or when a DC voltage of a second smoothing capacitor is higher than a second reference voltage.

4 Claims, 5 Drawing Sheets

POWER SUPPLY SYSTEM FOR ELECTRICALLY POWERED VEHICLE

CROSS-REFERENCE TO RELATED APPLICATIONS

This application claims priority to Japanese Patent Application No. 2015-191094 filed on Sep. 29, 2015, the entire contents of which are hereby incorporated by reference.

BACKGROUND

Field

The present disclosure relates to a power supply system for an electrically powered vehicle, more particularly, control for discharging residual charges of a smoothing capacitor in a power supply system upon detection of a collision of the electrically powered vehicle.

Description of the Background Art

In a power supply system for an electrically powered vehicle including an electric motor for driving the electrically powered vehicle, power conversion is performed between (i) a DC voltage from a power storage device and (ii) an AC voltage of the electric motor. Hence, the power supply system is provided with a capacitor for smoothing the DC voltage.

WO 2010/131340 describes control for discharging residual charges of a smoothing capacitor in the event of a collision of an electrically powered vehicle. Specifically, it is described that detecting a collision of the vehicle based on a sensor output triggers a converter in the power supply system to perform DC voltage conversion, thereby performing forced discharging control for residual charges of the capacitor. Particularly, WO 2010/131340 discloses a configuration for securely performing the forced discharging control by using the residual charges of the capacitor for generation of power supply voltage of a controller, which is configured to perform the above-described forced discharging control.

SUMMARY

Normally, the power supply voltage of such a controller is supplied from a low-voltage system battery (auxiliary battery) shared by other auxiliary loads. In the event of a collision of the electrically powered vehicle, a resulting impact causes short circuit of a power supply line in an auxiliary load, with the result that an auxiliary power supply voltage may be instantaneously decreased.

Generally, upon such instantaneous decrease of power supply voltage, a resetting operation is automatically started to perform an initialization process in the controller, which is constituted of an electronic control unit (ECU). Hence, in the configuration of WO 2010/131340, if the process for detecting a collision of the electrically powered vehicle based on a sensor output is performed at the same timing as the resetting operation of the controller (ECU), the forced discharging control is not started normally, with the result that the residual charges of the smoothing capacitor may not be discharged securely.

The present disclosure has been made to solve such a problem, and has an object to securely discharge residual charges of a smoothing capacitor in a power supply system of an electrically powered vehicle in the event of a collision of the vehicle.

In a certain aspect of the present disclosure, a power supply system for an electrically powered vehicle including an electric motor for vehicle driving includes: a power storage device connected to a first power line; a first smoothing capacitor connected to the first power line; a converter; a second smoothing capacitor connected to the second power line; an inverter; and a controller configured to operate with an auxiliary power supply voltage being supplied. The converter is configured to perform bidirectional DC voltage conversion between a second power line and the first power line in accordance with on/off control of a plurality of switching elements. The inverter is configured to convert a DC voltage on the second power line into an AC voltage for driving the electric motor. The controller is configured to perform an initialization process through a resetting operation when the auxiliary power supply voltage is returned to a voltage higher than a resetting voltage after the auxiliary power supply voltage is decreased to be smaller than the resetting voltage. Moreover, when a voltage of at least one of the first and second smoothing capacitors is higher than a predetermined voltage after the resetting operation, the controller is configured to perform forced discharging in which the controller controls the converter so as to consume residual charges in the first and second smoothing capacitors through the on/off control of the plurality of switching elements.

According to the power supply system for the electrically powered vehicle, the residual charges of the first and second smoothing capacitors can be discharged by the forced discharging using the converter when the resetting operation takes place in the controller due to the instantaneous decrease of the auxiliary power supply voltage resulting from the collision of the vehicle. As a result, the residual charges of the smoothing capacitors in the power supply system of the electrically powered vehicle can be discharged securely even when the initialization process through the resetting operation is performed by the controller in the event of the collision of the electrically powered vehicle.

The power supply system for the electrically powered vehicle further includes a collision detector configured to detect a collision of the electrically powered vehicle. The controller is configured to perform the forced discharging when the collision is detected by the collision detector or when the voltage of at least one of the first and second smoothing capacitors is higher than the predetermined voltage after the resetting operation.

With such a configuration, the residual charges of the first and second smoothing capacitors can be discharged more securely in the event of the collision of the vehicle by using both (i) the forced discharging triggered by the collision detected by the collision detector and (ii) the forced discharging triggered by the resetting operation of the controller.

The foregoing and other objects, features, aspects and advantages of the present disclosure will become more apparent from the following detailed description of the present disclosure when taken in conjunction with the accompanying drawings.

DETAILED DESCRIPTION

Figure 1:
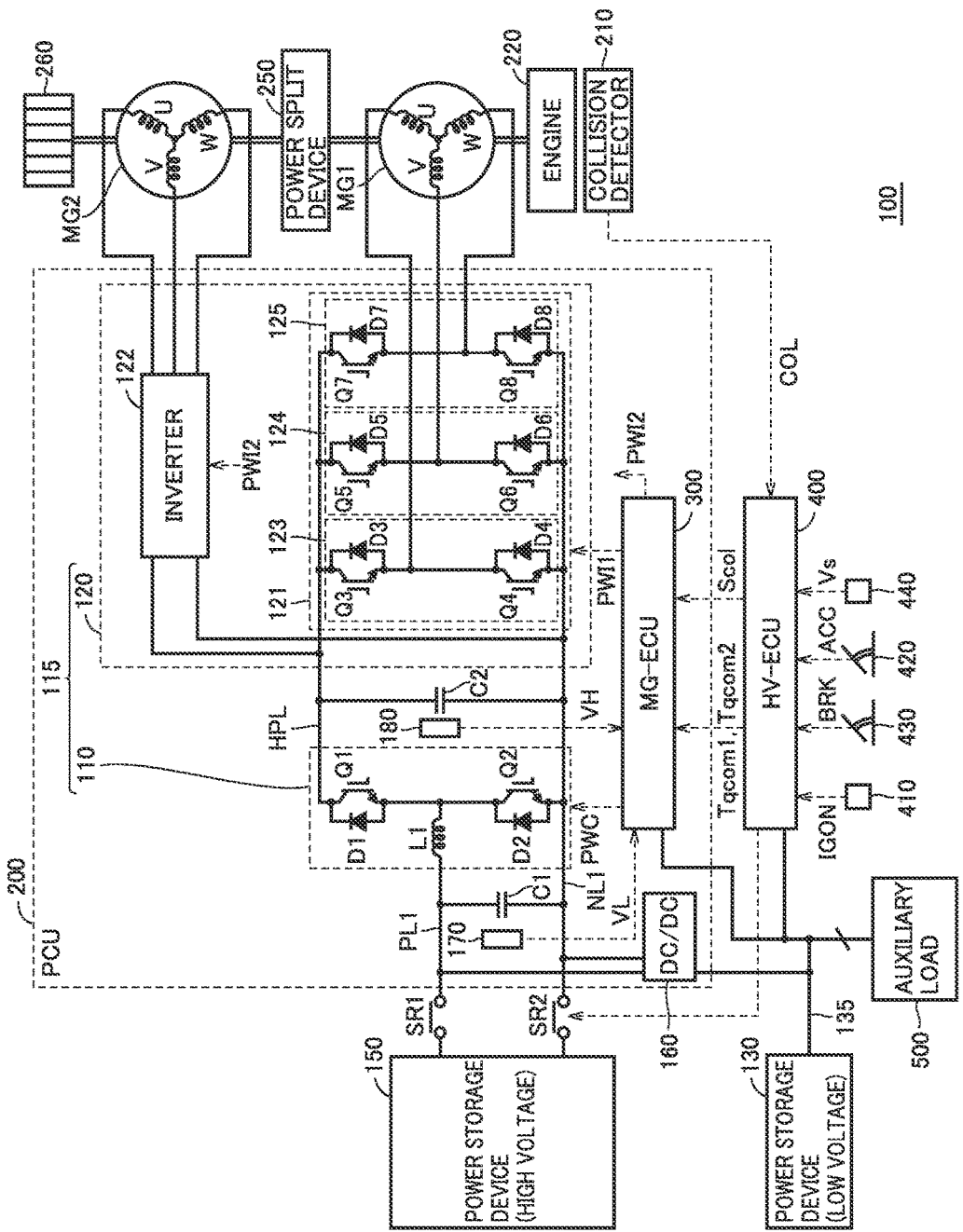
FIG. 1 is a block diagram showing an exemplary configuration of a power supply system of an electrically powered vehicle in accordance with the present embodiment.

The following describes embodiments of the present disclosure in detail with reference to figures. It should be noted that in the description below, the same or corresponding portions in the figures are given the same reference characters and are not described repeatedly in principle.

First Embodiment

FIG. 1 is a block diagram showing an exemplary configuration of a power supply system for an electrically powered vehicle in accordance with the present embodiment. It should be noted that in the present embodiment, a hybrid electrically powered vehicle including an engine and motor generators will be illustrated as an example of an electrically powered vehicle 100; however, the configuration of electrically powered vehicle 100 is not limited to this.

With reference to FIG. 1, electrically powered vehicle 100 includes: power storage devices 130, 150; a power conversion apparatus (hereinafter, also referred to as "PCU" (Power Control Unit)) 200; motor generators MG1, MG2; a collision detector 210; an engine 220; a power split device 250; driving wheels 260; and relays SR1, SR2.

Each of power storage devices 130, 150 is an energy storage element configured to be redischargeable. For example, each of power storage devices 130, 150 can be constituted of (i) a secondary battery such as a lithium ion battery, a nickel-hydrogen battery, or a lead storage battery, or (ii) a power storage element such as an electric double layer capacitor.

Power storage device 150 is connected to PCU 200 by a power line PL1 and a ground line NL1 via relays SR1, SR2. Power storage device 150 supplies PCU 200 with DC power for driving motor generators MG1, MG2. Further, power storage device 150 stores electric power generated by motor generators MG1, MG2 and supplied via PCU 200. The electric power supplied from power storage device 150 has a voltage (for example, 200 V) higher than that of electric power supplied from power storage device 130. Power storage device 150 corresponds to one example of the "power storage device".

On the other hand, power storage device 130 supplies an auxiliary power supply line 135 with power supply voltage for a below-described groups of ECUs (Electronic Control Units) and auxiliary loads 500 (hereinafter, both collectively referred to as "auxiliary system"). Examples of auxiliary loads 500 include audio devices, an air conditioner, a lamp room, a headlight, and the like. In FIG. 1, one block 500 comprehensively represents a plurality of devices. A line for supplying power supply voltage to each device is disposed to be appropriately branched.

An output voltage from power storage device 130 is lower (for example, 14 V) than the voltage of the electric power supplied from power storage device 150. A DC/DC converter 160, which is connected between (i) each of power line PL1 and ground line NL1 and (ii) auxiliary power supply line 135, is configured to step down the output voltage of power storage device 150. Accordingly, the power of power storage device 150 can be used to charge power storage device 130 and/or supply power to the auxiliary system.

Relays SR1, SR2 are respectively inserted in power line PL1 and ground line NL1, each of which connects power storage device 150 to PCU 200. Each of relays SR1, SR2 switches between supply and interruption of the electric power from power storage device 150 to PCU 200.

PCU 200 converts the DC voltage supplied from power storage device 150 into AC voltage, and supplies it to motor generators MG1, MG2. Further, PCU 200 converts AC voltage generated by each of motor generators MG1, MG2 into DC voltage, and charges power storage device 150 with it.

Each of motor generators MG1, MG2 is constituted of for example, a three-phase AC motor generator including a rotor having a permanent magnet embedded therein and a stator having three-phase coils connected to one another at a neutral point in the form of Y connection. When receiving the AC voltage from PCU 200, each of motor generators MG1, MG2 generates rotational driving power for driving the electrically powered vehicle. On the other hand, each of motor generators MG1, MG2 generates AC power when receiving rotational power from outside, and generates regenerative braking power in electrically powered vehicle 100 in accordance with a regenerative torque command sent from HV-ECU 400. Thus, each of motor generators MG1, MG2 is illustrated as one example of the "electric motor for vehicle driving".

Further, motor generators MG1, MG2 are coupled to engine 220 via power split device 250. Driving power generated by engine 220 and driving power generated by each of motor generators MG1, MG2 are controlled to be in an optimum ratio. Further, one of motor generators MG1, MG2 may serve only as an electric motor, and the other may serve only as an electric power generator. It is assumed in the first embodiment that motor generator MG1 serves as an electric power generator driven by engine 220 and motor generator MG2 serves as an electric motor for driving driving wheels 260.

For power split device 250, a planetary gear mechanism is used to distribute motive power, provided by engine 220, to driving wheels 260 and motor generator MG1.

PCU 200 includes a power converter 115, smoothing capacitors C1, C2, voltage sensors 170, 180, and an MG-ECU 300. Power converter 115 includes a converter 110 and an inverter 120. Further, inverter 120 includes: an inverter 121 for driving motor generator MG1; and an inverter 122 for driving motor generator MG2.

Converter 110 is connected between power lines PL1 and HPL. Converter 110 has a so-called "boost chopper circuit" configuration, and includes a reactor L1, power semiconductor switching elements (hereinafter, simply referred to as "switching elements") Q1, Q2, and diodes D1, D2.

Converter 110 alternately turns on/off switching elements Q1 and Q2, thereby performing bidirectional DC power conversion between power lines PL1 and HPL with a step-up ratio (VH/VL) of not less than 1.0. This step-up ratio is controlled in accordance with a duty ratio, which represents a ratio of ON periods of switching elements Q1 and Q2.

Inverter 121 has a so-called three-phase inverter circuit configuration, and is connected between converter 110 and motor generator MG1. Inverter 121 includes a U-phase arm 123, a V-phase arm 124, and a W-phase arm 125. U-phase arm 123, V-phase arm 124, and W-phase arm 125 are connected in parallel between power line HPL and ground line NL1. U-phase arm 123 includes switching elements Q3, Q4 connected in series. V-phase arm 124 includes switching elements Q5, Q6 connected in series. W-phase arm 125 includes switching elements Q7, Q8 connected in series. The intermediate points of the phase arms are connected to respective ends of U-phase, V-phase, and W-phase coils wound around a stator core (not shown) of motor generator MG1. The other ends of the U-phase, V-phase, and W-phase coils are connected to one another at the neutral point.

Inverter 121 receives a stepped-up voltage from converter 110 so as to drive motor generator MG1 for starting engine 220, for example. Further, inverter 121 supplies converter 110 with regenerative power generated by motor generator MG1 using mechanical motive power transmitted from engine 220. On this occasion, converter 110 is controlled by MG-ECU 300 to operate as an AC/DC converter. Inverter 121 turns on or off a gate signal of each of switching elements Q3 to Q8 in accordance with a control signal PWI1 sent from MG-ECU 300, thereby converting the DC voltage supplied from converter 110 into a desired AC voltage.

Inverter 122 is connected between converter 110 and motor generator MG2. The circuit configuration of inverter 122 is the same as that of inverter 121 and is therefore not described repeatedly in detail. Inverter 122 is controlled in accordance with a control signal PWI2 output from MG-ECU 300.

Inverter 122 converts a DC voltage supplied from converter 110 into a three-phase AC voltage and outputs it to motor generator MG2 to drive driving wheels 260. Further, in response to regenerative braking, inverter 122 performs AC/DC conversion of regenerative power generated by motor generator MG2 and outputs it to converter 110.

In the example of the configuration of FIG. 1, inverters 121 and 122 are capable of converting (i) DC voltage on power line HPL into (ii) AC voltage for driving motor generators MG1, MG2. That is, power line PL1 corresponds to the "first power line", and power line HPL corresponds to the "second power line".

Smoothing capacitor C1 is connected between power line PL1 and ground line NL1 at the low-voltage side (that is, the power storage device 150 side) of converter 110 to remove an AC component of the DC voltage. Accordingly, a ripple voltage upon switching of switching elements Q1, Q2 can be absorbed from the DC voltage on power line PL1.

Likewise, smoothing capacitor C2 is connected between power line HPL and ground line NL1 at the high-voltage side (that is, the inverter 120 side) of converter 110 to remove an AC component of the DC voltage. Accordingly, the ripple voltage generated in converter 110 and inverter 120 upon switching can be absorbed. Thus, smoothing capacitor C1 corresponds to the "first smoothing capacitor", and smoothing capacitor C2 corresponds to the "second capacitor".

Voltage sensor 170 detects a DC voltage VL across smoothing capacitor Cl, and sends an indication of the detected voltage VL to MG-ECU 300. Further, voltage sensor 180 detects a DC voltage VH across smoothing capacitor C2, i.e., output voltage of converter 110 (corresponding to an input voltage of inverter 120), and sends an indication of the detected voltage VH to MG-ECU 300.

HV-ECU 400 controls operations of in-vehicle devices based on outputs of various sensors such that electrically powered vehicle 100 travels in accordance with a driver's operation. Among vehicle control functions, FIG. 1 representatively shows vehicle control functions in connection with the present embodiment. For example, HV-ECU 400 receives: (i) an operation signal of an ignition switch (IG switch) 410; (ii) indications of a position of an accelerator pedal 420 (accelerator position Acc) and an operation amount of a brake pedal 430 (brake operation amount BRK); and (iii) an indication of a vehicle speed Vs detected by a vehicle speed sensor 440. Then, based on vehicle speed Vs, accelerator position Acc, and brake operation amount BRK, HV-ECU 400 outputs torque command values Tqcom1, Tqcom2 for motor generators MG1, MG2.

Moreover, HV-ECU 400 turns on relays SR1, SR2 upon an IG-ON time at which ignition switch 410 is turned on. Turning on relays SR1, SR2 leads to a state in which electric power of power storage device 130 can be used for motor generators MG1, MG2. On the other hand, upon an IG-OFF time, HV-ECU 400 turns off relays SR1, SR2. Accordingly, power storage device 130 is electrically disconnected from motor generators MG1, MG2.

MG-ECU 300 receives detection values of DC voltages VL, VH from voltage sensors 170, 180 and receives torque command values Tqcom1, Tqcom2 from HV-ECU 400. MG-ECU 300 generates control signals PWC, PWI1, PWI2 for controlling power conversion in converter 110 and inverter 120 to control output torques of motor generators MG1, MG2 in accordance with torque command values Tqcom1, Tqcom2. Converter 110 and inverter 120 perform power conversion in accordance with control signals PWC, PWI1, PWI2. As a result, vehicle driving power or vehicle braking power according to an operation of accelerator pedal 420 or brake pedal 430 by the driver is secured by outputs from motor generators MG1, MG2.

Next, the following describes control in the event of a collision of the electrically powered vehicle. Collision detector 210 includes a sensor (such as a G sensor) (not shown) and detects, based on an output of the sensor, whether or not a collision of electrically powered vehicle 100 has occurred. A signal COL indicating the result of detection is output from collision detector 210 to HV-ECU 400. In the event of a collision of electrically powered vehicle 100, HV-ECU 400 can detect the occurrence of collision of electrically powered vehicle 100 based on signal COL from collision detector 210. When the occurrence of collision is detected, HV-ECU 400 outputs a collision detection signal Scol to MG-ECU 300.

In the event of a collision of a vehicle, it is concerned that an impact caused by the collision results in disconnection and short circuit. Accordingly, even when the driver does not turn off ignition switch 410, HV-ECU 400 turns off relays SR1, SR2 with the IG remaining to be on, thereby stopping power supply from power storage device 130.

Furthermore, in order to stop outputs of motor generators MG1, MG2, converter 110 and inverter 120 also become temporarily non-operational. In this state, however, charges corresponding to DC voltages VL, VH remain in smoothing capacitors C1, C2. To address this, the electrically powered vehicle in accordance with the present embodiment employs converter 110 to discharge the residual charges of smoothing capacitors C1, C2. Accordingly, even though smoothing capacitors C1, C2 have large capacitances, they can be promptly discharged as compared with residual charge discharging using discharging resistors connected in parallel. Moreover, in consideration of such a fact that a discharging resistor having a high breakdown voltage has a large size, it is a great advantage in terms of device downsizing that no discharging resistors need to be connected to smoothing capacitors C1, C2.

However, in the event of a collision of the vehicle, an impact caused by the collision may result in short circuit of power supply lines in a part of auxiliary loads 500. The occurrence of short circuit leads to instantaneous decrease of auxiliary power supply voltage, thus presumably resulting in resetting the ECU(s) (MG-ECU 300 and/or HV-ECU 400).

Figure 2:
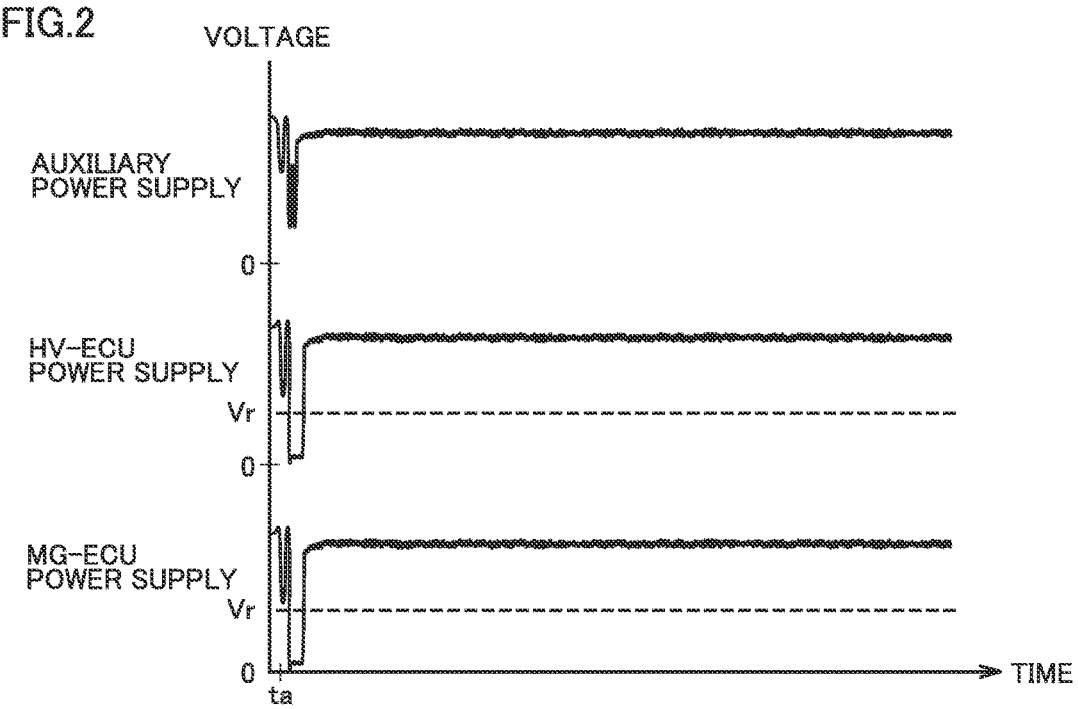
FIG. 2 is a waveform diagram illustrating an exemplary power supply voltage behavior of an ECU in the event of a collision of the vehicle.

FIG. 2 shows a waveform diagram illustrating an exemplary power supply voltage behavior of the ECU(s) in the event of a collision of the vehicle.

With reference to FIG. 2, in the event of a collision of electrically powered vehicle 100 at a time ta, an impact caused by the collision results in short circuit of power supply lines of a part of auxiliary loads 500, thus instantaneously decreasing the voltage (auxiliary power supply voltage) on auxiliary power supply line 135. Accordingly, the power supply voltage of HV-ECU 400 and the power supply voltage of MG-ECU 300 are also decreased instantaneously.

In each of the ECUs, when the power supply voltage of the ECU is returned to a voltage higher than a predetermined resetting voltage Vr after the power supply voltage of the ECU is decreased to be smaller than resetting voltage Vr, a resetting operation is automatically started to perform an initialization process.

On the other hand, in the event of a collision of the vehicle, converter 110 is controlled to start a discharging operation of residual charges of smoothing capacitors C1 and C2 (hereinafter, also referred to as "forced discharging operation") by normally performing a series of processes in which HV-ECU 400 detects the occurrence of collision based on signal COL from collision detector 210 and MG-ECU 300 receives collision detection signal Scol from HV-ECU 400. However, if the series of processes of vehicle collision detection are performed at the same timing as the initialization process of the ECU caused by the decrease of voltage, the forced discharging operation may not be started. In such a case, it is concerned that in the event of a collision of the vehicle, residual charges of smoothing capacitors C1, C2 cannot be discharged.

To address this, in the present embodiment, even if the collision detection process is not normally performed due to the instantaneous decrease of power supply voltage in the event of a collision of the vehicle, the forced discharging operation is performed to securely discharge the residual charges of the smoothing capacitors C1 and C2.

Figure 3:
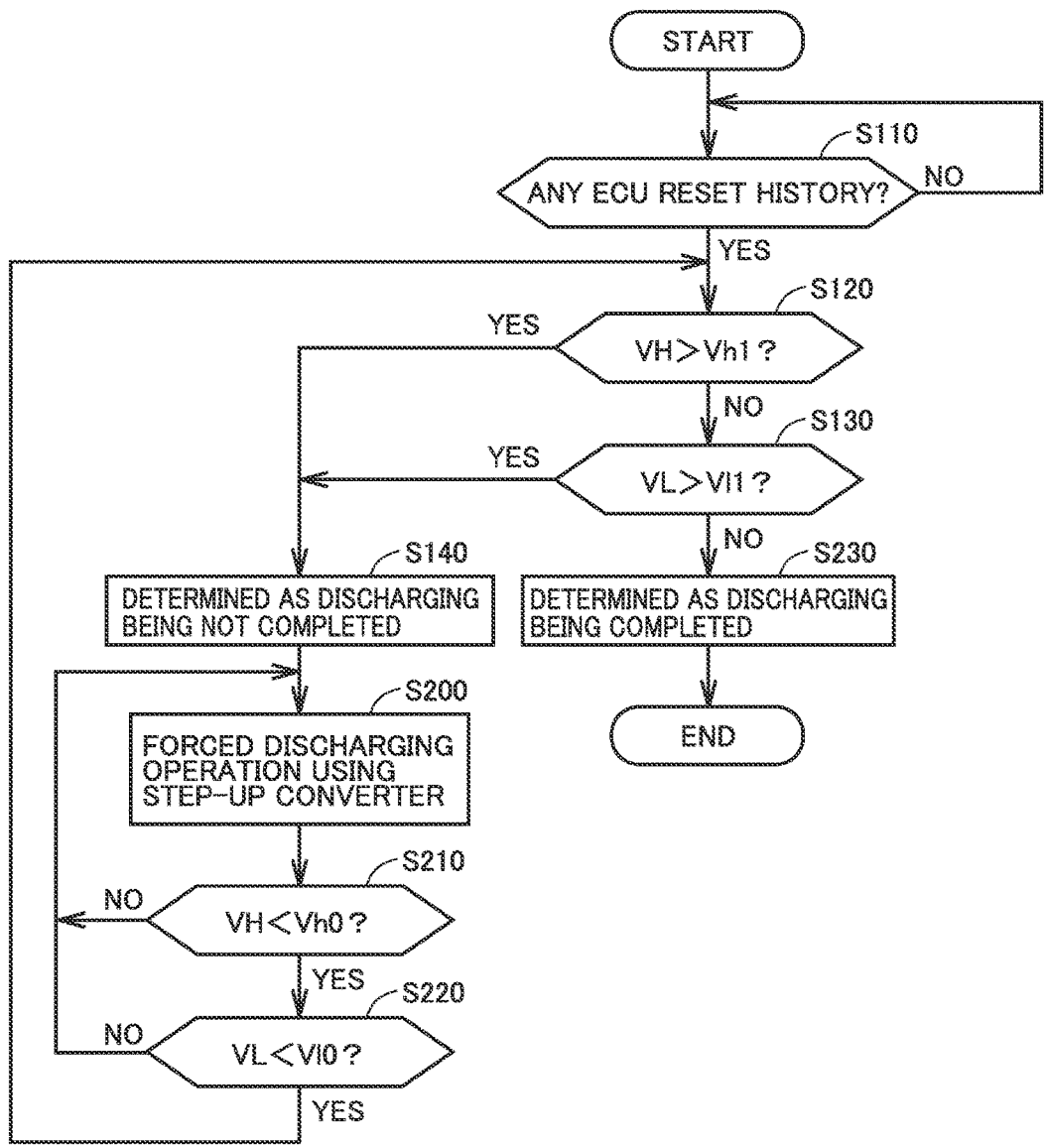
FIG. 3 is a flowchart illustrating a control process of residual charge discharging control in accordance with the first embodiment.

In the electrically powered vehicle in accordance with the present embodiment, the forced discharging operation shown in FIG. 3 is performed by MG-ECU 300. For example, the process shown in FIG. 3 can be started as a part of the initialization process of MG-ECU 300. That is, MG-ECU 300 corresponds to one example of the "controller". It should be noted that a control process in each step shown in each of flowcharts including FIG. 3 may be performed by one of (i) a software process in which MG-ECU 300 executes a predetermined program and (ii) a hardware process performed by a built-in electronic circuit.

With reference to FIG. 3, in a step S110, MG-ECU 300 determines whether or not there is a reset history of the ECU(s). When a history of performing a resetting operation remains in at least one of MG-ECU 300 and HV-ECU 400, it is determined as YES in step S110. On the other hand, when there is no reset history in both MG-ECU 300 and HV-ECU 400, it is determined as NO in step S110, with the result that processes of a step S120 and subsequent steps will not be started.

When there is an ECU reset history (when determined as "YES" in S110), MG-ECU 300 determines, based on DC voltages VH and VL in steps S120 and S130, whether or not one of smoothing capacitors C1 and C2 has a level of residual charges that requires forced discharging.

Specifically, when DC voltage VH is not more than a reference voltage Vh1 (when determined as "NO" in S120) and DC voltage VL is not more than a reference voltage Vl1 (when determined as "NO" in S130), MG-ECU 300 advances the process to a step S230, in which MG-ECU 300 determines that discharging of smoothing capacitors C1 and C2 has been completed. Reference voltages Vh1 and Vl1 are threshold values defined in advance in view of safety and the like.

On the other hand, when DC voltage VH is higher than reference voltage Vh1 (when determined as "YES" in S120) or when DC voltage VL is higher than reference voltage Vl1 (determined as "YES" in S130), MG-ECU 300 advances the process to a step S140, in which MG-ECU 300 determines that discharging of smoothing capacitors C1 and/or C2 has not been completed. Further, MG-ECU 300 advances the process to a step S200 to start the forced discharging operation using converter 110.

In the forced discharging operation, MG-ECU 300 outputs a control signal PWC such that converter 110 repeatedly performs (i) a step-up operation to turn on switching element Q2 and turn off switching element Q1 and (ii) a step-down operation to turn on switching element Q1 and turn off switching element Q2.

In the step-up operation, due to the charges of smoothing capacitor C1 (DC voltage VL), a current flows in a path including smoothing capacitor C1 and reactor L1. In the step-down operation, due to the charges of smoothing capacitor C2 (DC voltage VH), a current flows in a path including smoothing capacitors C1, C2 and reactor L1. In each of the step-up operation and the step-down operation, due to energy loss by reactor L1 (copper loss or the like) and switching loss by switching elements Q1, Q2, power loss occurs with regard to the current resulting from the movement of charges. Due to such power loss, the residual charges of smoothing capacitors C1 and C2 are consumed gradually. In this way, during the forced discharging operation, converter 110 consumes the residual charges of smoothing capacitors C1 and C2 through the on/off control of switching elements Q1, Q2.

During the forced discharging operation (S200), MG-ECU 300 regularly determines, based on DC voltages VH and VL in steps S210 and S220, whether or not discharging of the residual charges has been completed. Specifically, when DC voltage VH is decreased to be smaller than a reference voltage Vh0 (when determined as "YES" in S210) and DC voltage VL is decreased to be smaller than a reference voltage Vl0 (when determined as "YES" in S220), MG-ECU 300 advances the process to a step S230, in which MG-ECU 300 determines that discharging of smoothing capacitors C1 and C2 has been completed. Reference voltages Vh0 and Vl0 are threshold values defined in advance in view of safety and the like.

On the other hand, when VH≥Vh0 (when determined as "NO" in S210) or VL≥Vl0 (when determined as "NO" in S220), MG-ECU 300 determines that discharging has not been completed, and repeatedly performs the processes of S200 to S220. Accordingly, the forced discharging operation (S200) by converter 110 is performed continuously.

When DC voltages VH and VL are decreased to be smaller than reference voltages Vh0 and Vl0 due to the forced discharging operation (when determined as "YES" in S210 and S220), MG-ECU 300 returns the process to step S120. On this occasion, it is determined as "NO" in steps S120 and S130 and it is therefore determined that discharging of smoothing capacitors C1 and C2 has been completed (S230).

Basically, although reference voltages Vh0 and Vh1 have the same values and reference voltages Vl0 and Vl1 have the same values, a process upon ending the forced discharging operation is facilitated by providing a small margin as follows: Vh0<Vh1 and Vl0<Vl1.

Thus, according to the residual charge discharging control of the electrically powered vehicle in accordance with the first embodiment, the forced discharging operation by converter 110 is performed when (i) occurrence of a resetting operation of MG-ECU 300 and/or HV-ECU 400 in response to a collision of the vehicle is detected based on the reset history of the ECU(s) and (ii) charges remain in at least one of smoothing capacitors C1 and C2 after returning from the resetting operation. Accordingly, even if the collision detection process is performed at the same timing as the ECU resetting process in the event of a collision of the vehicle, converter 110 can be controlled to securely discharge the residual charges of smoothing capacitors C1, C2.

Figure 4:
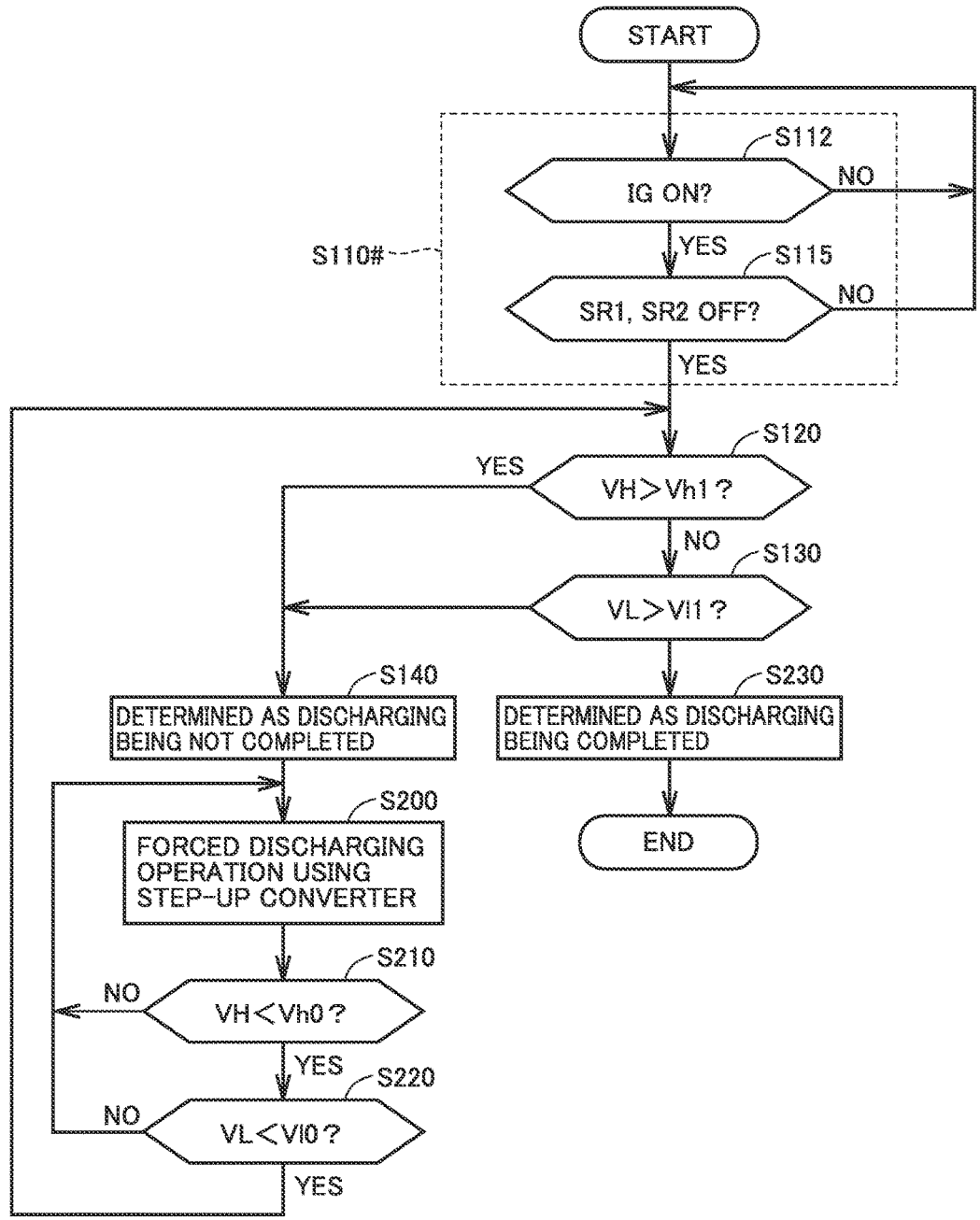
FIG. 4 is a flowchart illustrating a modification of the residual charge discharging control shown in FIG. 3.

FIG. 4 shows a modification of the control process shown in FIG. 3. The process shown in FIG. 4 can be performed by MG-ECU 300 as with FIG. 3.

In comparison of FIG. 4 with FIG. 3, in the modification, MG-ECU 300 performs a step S110# instead of step S110 (FIG. 3). Step S110# has steps S112 and S115.

In step S112, MG-ECU 300 determines whether or not the IG is on. Furthermore, when the IG is on (determined as "YES" in S112), MG-ECU 300 determines, in step S115, whether or not relays SR1, SR2 are off.

As described above, in the event of a collision, resetting MG-ECU 300 and/or HV-ECU 400 may result in MG-ECU 300 failing to normally receive collision detection signal Scol. However, even in such a case, relays SR1, SR2 can be immediately turned off by HV-ECU 400 in accordance with signal COL from collision detector 210 for the purpose of safety. Thus, the occurrence of the resetting operation of MG-ECU 300 and/or HV-ECU 400 in response to the collision of the vehicle can be indirectly detected by detecting such a state that the IG is on and relays SR1, SR2 are off even when the MG-ECU 300 does not receive collision detection signal Scol.

Hence, when the IG is on and SR1, SR2 are off (when determined as "YES" in S112 and S115), MG-ECU 300 determines, in the same steps S120 and S130 as those in FIG. 3, whether it is necessary to perform the forced discharging operation onto at least one of smoothing capacitors C1 and C2. When the forced discharging operation is necessary (determined as "YES" in S120 or S130), MG-ECU 300 can securely discharge the residual charges in smoothing capacitor C1 and/or C2 in the same steps S140 and S200 to S220 as those in FIG. 3.

Figure 5:
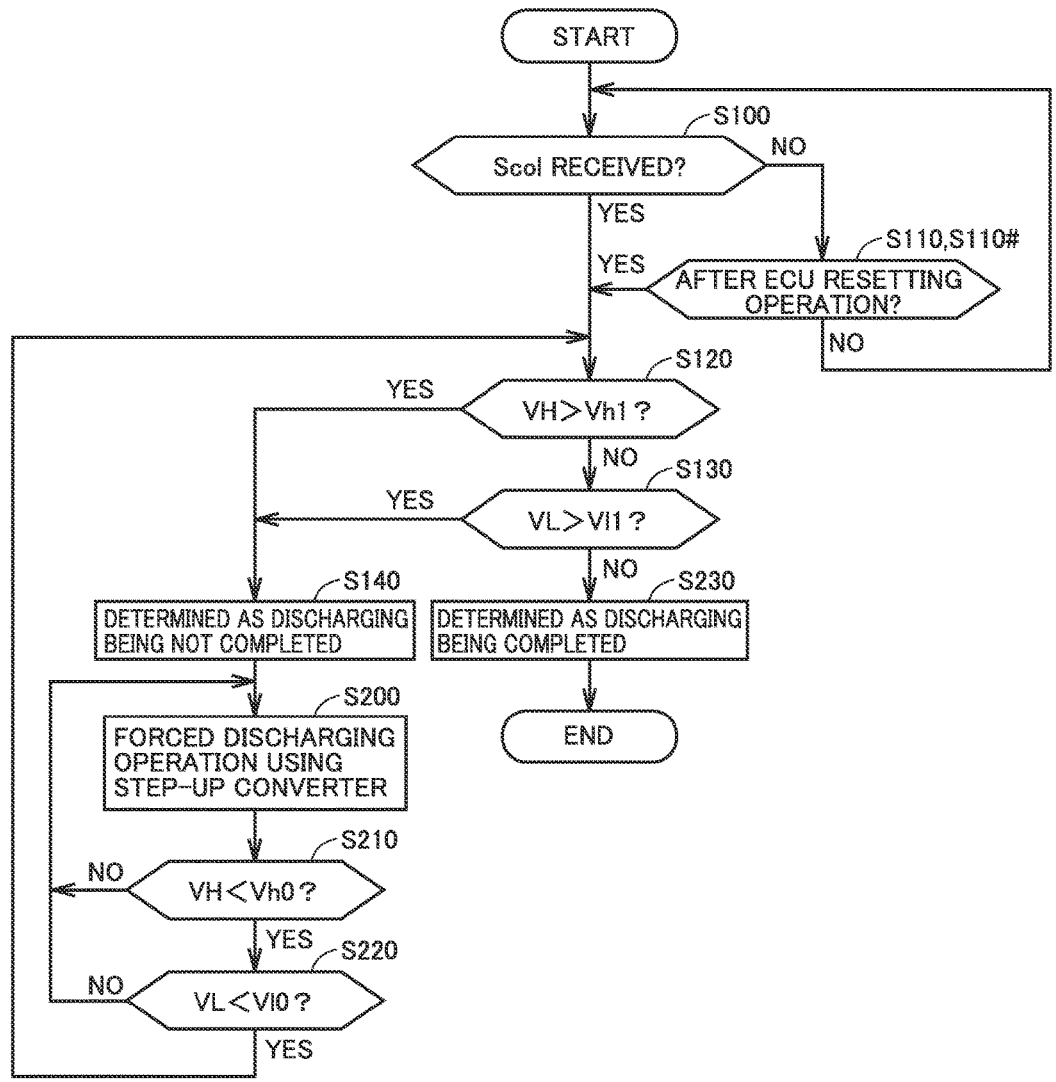
FIG. 5 is a flowchart illustrating a control process of the residual charge discharging control in accordance with a second embodiment.

As such, also with the control process shown in FIG. 5, the forced discharging operation can be performed securely when charges remain in at least one of smoothing capacitors C1 and C2 after MG-ECU 300 and/or HV-ECU 400 returns from the resetting operation.

As described above, according to the residual charge discharging control in the electrically powered vehicle in accordance with the first embodiment, residual charges of the smoothing capacitor(s) in the power supply system can be discharged securely even if the process by the ECU(s) in connection with the detection of a collision of the vehicle is performed at the same timing as the resetting operation of the ECU(s) caused by the instantaneous voltage decrease in the event of the collision of the vehicle.

Second Embodiment

FIG. 5 is a flowchart illustrating a control process of residual charge discharging control in accordance with a second embodiment. The control process shown in FIG. 5 is performed by MG-ECU 300.

With reference to FIG. 5, in a step S100, MG-ECU 300 detects whether or not collision detection signal Scol has been generated by HV-ECU 400.

During a period (when determined as "NO" in S100) in which no collision detection signal Scol is generated, MG-ECU 300 determines, in step S110 (FIG. 3) or step S110# (FIG. 4), whether or not MG-ECU 300 and/or HV-ECU 400 has been reset in response to the collision of the vehicle.

When collision detection signal Scol is received (when determined as "YES" in S100) or when it is detected that the ECU(s) have been reset (when determined as "YES" in S110 or S110#), MG-ECU 300 performs the same processes of the step S120 and subsequent steps as those in FIG. 3 and FIG. 4. On the other hand, the processes of step S120 and subsequent steps are not started when collision detection signal Scol is not received (when determined as "NO" in S100) and when it is not detected that the ECU(s) have been reset (when determined as "NO" in S110 or S110#).

According to the residual charge discharging control of the electrically powered vehicle in accordance with the second embodiment, it is possible to employ both (i) the forced discharging operation triggered by the collision detected by collision detector 210 and (ii) the forced discharging operation triggered by the resetting operation of the ECU(s). As a result, in the event of a collision of the vehicle, converter 110 is controlled to more securely discharge the residual charges of smoothing capacitors C1, C2.

It should be noted that in the present embodiment, it has been exemplified and illustrated that the forced discharging operation on the smoothing capacitor(s) is started by the plurality of ECUs (MG-ECU 300 and HV-ECU 400) in the event of a collision of the vehicle; however, also when the same control process is performed by a single ECU, the residual charges of the smoothing capacitor(s) in the power supply system can be discharged securely by applying the residual charge discharging control shown in FIG. 3 to FIG. 5 even if the ECU is reset in the event of a collision of the vehicle.

Moreover, the configuration of the electrically powered vehicle shown in FIG. 1 is also just exemplary, and the residual charge discharging control involving the forced discharging operation in accordance with the present embodiment can be applied to any vehicle configuration as long as the vehicle has a configuration with which the residual charges of the smoothing capacitor(s) can be discharged by the converter in the power supply system for driving and controlling the motor for vehicle driving. For example, the present disclosure can be applied to (i) a hybrid vehicle (inclusive of so-called "series hybrid vehicle", "parallel hybrid vehicle", and the like) having a powertrain configuration different from that of the example of FIG. 1 or (ii) an electric vehicle or fuel cell vehicle including no engine, as long as the vehicle has a configuration with which the electric motor for vehicle driving is driven and controlled by the power supply system including the converter and the smoothing capacitors as described above.

Although the present disclosure has been described and illustrated in detail, it is clearly understood that the same is by way of illustration and example only and is not to be taken by way of limitation, the scope of the present subject matter being interpreted by the terms of the appended claims.

What is claimed is:

1. A power supply system for an electrically powered vehicle including an electric motor for vehicle driving, the power supply system comprising:
   a power storage device connected to a first power line;
   a first smoothing capacitor connected to the first power line;
   a converter configured to perform bidirectional DC voltage conversion between a second power line and the first power line in accordance with on or off control of a plurality of switching elements;
   a second smoothing capacitor connected to the second power line;
   an inverter configured to convert a DC voltage on the second power line into an AC voltage for driving the electric motor; and
   a controller configured to operate with an auxiliary power supply voltage being supplied,
   the controller being configured to perform an initialization process through a resetting operation when the auxiliary power supply voltage is returned to a voltage higher than a resetting voltage after the auxiliary power supply voltage is decreased to be smaller than the resetting voltage,
   when a voltage of at least one of the first and second smoothing capacitors is higher than a predetermined voltage after the resetting operation, the controller being configured to perform forced discharging in which the controller controls the converter so as to consume residual charges in the first and second smoothing capacitors through the on or off control of the plurality of switching elements.

2. The power supply system for the electrically powered vehicle according to claim 1, further comprising a collision detector configured to detect a collision of the electrically powered vehicle, wherein
   the controller is configured to perform the forced discharging when the collision is detected by the collision detector or when the voltage of at least one of the first and second smoothing capacitors is higher than the predetermined voltage after the resetting operation.

3. The power supply system for the electrically powered vehicle according to claim 2, wherein
   the controller includes:
      a first control unit configured to receive an output of the collision detector; and
      a second control unit configured to control an operation of the converter,
   the first control unit is configured to output a collision detection signal to the second control unit when the collision is detected by the collision detector, and
   the second control unit is configured to perform the forced discharging when the collision detection signal is received and the voltage of at least one of the first and second smoothing capacitors is higher than the predetermined voltage.

4. The power supply system for the electrically powered vehicle according to claim 3, further comprising:
   a relay connected between the power storage device and the first power line; and
   an ignition switch configured to be on during an operation of the electrically powered vehicle, wherein
   the first control unit is configured to control the relay to open and close in response to turning on and off of the ignition switch, and is configured to open the relay when the collision is detected by the collision detector, and
   in addition to performing the forced discharging when the collision detection signal is received and the voltage of at least one of the first and second smoothing capacitors is higher than the predetermined voltage, the second control unit is configured to perform the forced discharging when (i) the collision detection signal is not received, (ii) the relay is opened with the ignition switch being on, and (iii) the voltage of at least one of the first and second smoothing capacitors is higher than the predetermined voltage.

* * * * *